United States Patent
Koski

(10) Patent No.: US 11,159,009 B2
(45) Date of Patent: Oct. 26, 2021

(54) VOLTAGE REGULATOR OVER-CURRENT PROTECTION

(71) Applicant: QUALCOMM Incorporated, San Diego, CA (US)

(72) Inventor: Marko Koski, Chandler, AZ (US)

(73) Assignee: QUALCOMM INCORPORATED, San Diego, CA (US)

( * ) Notice: Subject to any disclaimer, the term of this patent is extended or adjusted under 35 U.S.C. 154(b) by 388 days.

(21) Appl. No.: 14/151,725

(22) Filed: Jan. 9, 2014

(65) Prior Publication Data

US 2014/0292292 A1 Oct. 2, 2014

Related U.S. Application Data

(60) Provisional application No. 61/807,212, filed on Apr. 1, 2013.

(51) Int. Cl.
*H02M 3/158* (2006.01)
*H02M 1/32* (2007.01)
*H02H 7/12* (2006.01)

(52) U.S. Cl.
CPC ............ *H02H 7/1213* (2013.01); *H02M 1/32* (2013.01); *H02M 3/1588* (2013.01); *Y02B 70/10* (2013.01)

(58) Field of Classification Search
CPC .......... H02H 3/332; H02H 3/445; H02H 3/08; H02H 3/087; H02H 7/20; H02H 7/1213; H01H 47/325; H02M 1/32; H02M 3/1588; Y02B 70/1466
USPC ......................................... 323/271, 282–285
See application file for complete search history.

(56) References Cited

U.S. PATENT DOCUMENTS 4,447,841 A     5/1984  Kent
4,881,023 A *  11/1989  Perusse ................... G01S 7/282
                                                            323/266
5,548,206 A *   8/1996  Soo ..................... H02M 3/1588
                                                            323/284

(Continued)

FOREIGN PATENT DOCUMENTS

CN          1954469 A    4/2007
CN        101005237 A    7/2007

(Continued)

OTHER PUBLICATIONS

International Search Report and Written Opinion—PCT/US2014/032489—ISA/EPO—dated Aug. 22, 2014.

(Continued)

*Primary Examiner* — Gary L Laxton
(74) *Attorney, Agent, or Firm* — Chui-kiu Teresa Wong

(57) ABSTRACT

Exemplary embodiments are related to a buck regulator. A buck regulator may include an inductor selectively coupled to an output and a power supply. The regulator may also include a controller configured to detect an over-current event if an amount of current flowing from the power supply to the inductor is equal to or greater than a current threshold and detect a low-voltage event if a voltage at the output is less than or equal to a reference voltage. Further, in response to the over-current event and the low-voltage event, the controller may be configured to prevent current from flowing from the power supply to the inductor until substantially all energy stored by the inductor has been dissipated.

11 Claims, 9 Drawing Sheets

(56) References Cited

U.S. PATENT DOCUMENTS

| | | | | |
|---|---|---|---|---|
| 5,929,615 A * | 7/1999 | D'Angelo | G05F 1/618 | 323/222 |
| 6,181,123 B1 | 1/2001 | Jou et al. | | |
| 6,677,738 B1 * | 1/2004 | Hesse | H02H 7/1213 | 323/284 |
| 7,456,623 B2 * | 11/2008 | Hasegawa | H02M 1/38 | 323/284 |
| 8,018,694 B1 * | 9/2011 | Wu | H02M 1/32 | 361/18 |
| 8,044,648 B1 * | 10/2011 | Kahn | H02M 3/156 | 323/282 |
| 8,085,025 B2 | 12/2011 | Wu | | |
| 8,242,764 B2 * | 8/2012 | Shimizu | H02M 3/1588 | 323/284 |
| 8,836,294 B2 * | 9/2014 | Kung | H02M 3/1588 | 323/222 |
| 8,836,300 B2 * | 9/2014 | Sohma | H02M 3/1588 | 323/272 |
| 9,584,019 B2 * | 2/2017 | Shiwaya | H02M 3/158 | |
| 9,712,046 B2 * | 7/2017 | Sandner | H02M 3/1588 | |
| 2002/0070773 A1 * | 6/2002 | Frey | F02D 41/20 | 327/108 |
| 2004/0257271 A1 * | 12/2004 | Jacobson | G01S 7/282 | 342/175 |
| 2006/0164774 A1 | 7/2006 | Herbold et al. | | |
| 2006/0273842 A1 * | 12/2006 | Kim | G05F 3/205 | 327/534 |
| 2006/0290333 A1 | 12/2006 | Fukushi et al. | | |
| 2006/0290336 A1 * | 12/2006 | Bazes | H02M 3/156 | 323/312 |
| 2007/0085520 A1 * | 4/2007 | Ho | H02M 3/1588 | 323/282 |
| 2007/0229041 A1 * | 10/2007 | Oki | H02H 3/087 | 323/266 |
| 2008/0136341 A1 * | 6/2008 | Araki | H02M 3/33507 | 315/209 R |
| 2008/0231244 A1 * | 9/2008 | Yamada | H02M 3/158 | 323/282 |
| 2008/0252274 A1 * | 10/2008 | Schindler | H02M 3/1588 | 323/282 |
| 2010/0066328 A1 | 3/2010 | Shimizu et al. | | |
| 2010/0117686 A1 | 5/2010 | Sheahan | | |
| 2010/0164456 A1 | 7/2010 | Oyama | | |
| 2010/0203919 A1 * | 8/2010 | Kelleher | H04B 1/40 | 455/550.1 |
| 2010/0219802 A1 * | 9/2010 | Lin | H02M 3/33507 | 323/284 |
| 2011/0050185 A1 | 3/2011 | Notman et al. | | |
| 2012/0187930 A1 * | 7/2012 | Williams | G05F 1/5735 | 323/273 |
| 2013/0162230 A1 * | 6/2013 | Miyamae | G05F 1/46 | 323/271 |
| 2013/0207625 A1 * | 8/2013 | Futamura | G05F 1/10 | 323/271 |
| 2013/0314061 A1 * | 11/2013 | Forghani-zadeh | G05F 1/46 | 323/271 |
| 2014/0077790 A1 * | 3/2014 | Sohma | H02M 3/1588 | 323/313 |
| 2014/0152284 A1 * | 6/2014 | Rozek | H02M 3/156 | 323/284 |
| 2014/0192564 A1 * | 7/2014 | Tang | H02M 3/33592 | 363/21.14 |

FOREIGN PATENT DOCUMENTS

| | | |
|---|---|---|
| CN | 101272094 A | 9/2008 |
| CN | 102843032 A | 12/2012 |
| EP | 2515422 A1 | 10/2012 |
| GB | 2447875 A | 10/2008 |
| JP | 2005333691 A | 12/2005 |

OTHER PUBLICATIONS

European Search Report—EP20212539—Search Authority—Munich—dated Mar. 19, 2021.

* cited by examiner

VOLTAGE REGULATOR OVER-CURRENT PROTECTION

CROSS-REFERENCE TO RELATED APPLICATION(S)

This application claims the benefit of U.S. Provisional Application Ser. No. 61/807,212, entitled "POWER REGULATOR" and filed on Apr. 1, 2013, which is expressly incorporated by reference herein in its entirety.

BACKGROUND

Field

The present invention relates generally to voltage regulators. More specifically, the present invention relates to embodiments for protecting buck regulators against over-current.

Background

Wireless communication devices require a battery or external DC power supply for a power source. Within a wireless communication device, there are integrated circuits (ICs), which typically operate at a much lower DC voltage than either a battery or an external DC power supply attached to the wireless communication device. To facilitate integrated circuits operation at a low operating voltage, a switching voltage regulator is usually required to convert either an external DC power supply or battery voltage to the integrated circuits lower supply voltage. A switching voltage regulator is a control circuit configured for rapidly switching power transistors (e.g., MOSFETs) on and off in order to stabilize an output voltage or current. Switching regulators are typically used as replacements for the linear regulators when higher efficiency, smaller size or lighter weight is required. However, switching regulators are more complicated and their switching currents can cause noise problems if not carefully suppressed.

A buck regulator, which is an example of a switching regulator, is a step-down DC-to-DC converter. A buck regulator typically includes two switches (e.g., a transistor and a diode) as well as an inductor and a capacitor for filtering of an output voltage ripple. A synchronous buck regulator is a modified version of the basic buck regulator circuit topology in which the diode is replaced by a second transistor. Generally, a buck regulator alternates between connecting the inductor to a source voltage to store energy in the inductor ("on state") and discharging the inductor into a load ("off state").

A need exists for an enhanced buck regulator. More specifically, a need exists for embodiments related to protecting buck regulators against over-current conditions.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
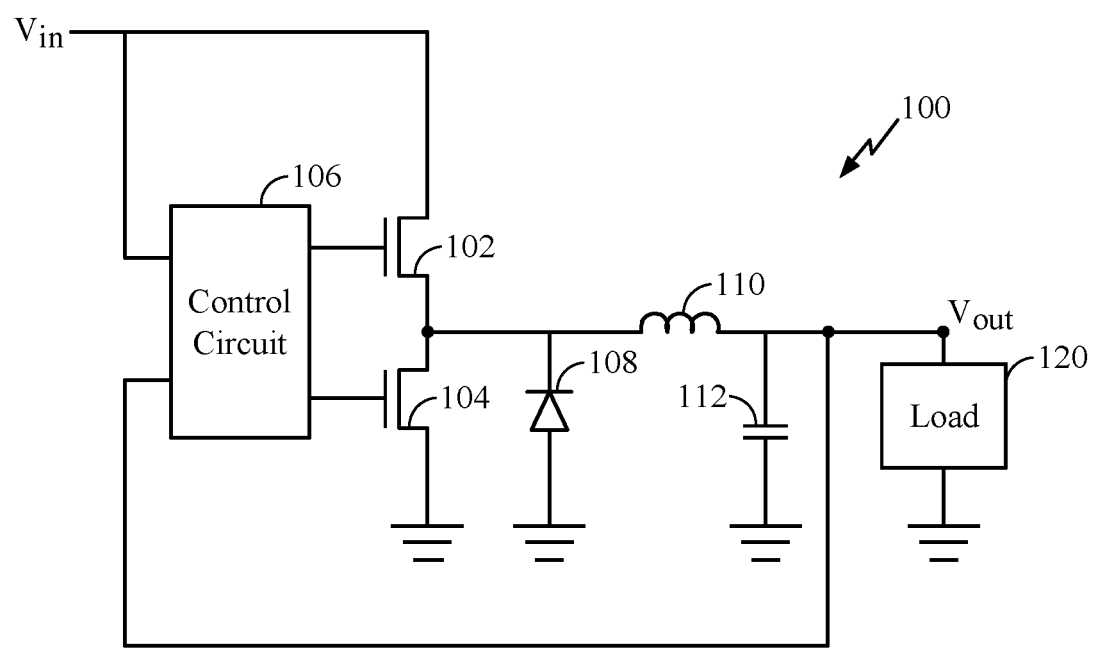
FIG. 1 illustrates a buck regulator including a plurality of transistors.

FIG. 1 illustrates a buck regulator 100, which may be used to decrease a voltage from a battery and supply a DC voltage to an electronic device. Buck regulator 100 includes transistors 102 and 104, each of which that are controlled by a controller 106. Buck regulator 100 also includes a diode 108, a capacitor 112, an inductor 110, and a load 120, which receives an output voltage of the buck regulator 100. As will be understood, controller 106 is configured to vary the duty cycles at which the transistors 102 and 104 are turned on to alternately connect and disconnect inductor 110 to and from source voltage (Vin). As inductor 110 stores energy and discharges the energy, it produces the output voltage Vout, which is somewhat smaller than source voltage Vin.

Buck regulators are generally required to provide protection against short circuiting to ground at a regulated output node. Active current limiting may be implemented as peak current detection to decide when to override a normal control loop to turn off a p-type field effect transistor (PFET) of a regulator and turn on an n-type field effect transistor (NFET) of the regulator. A decision must be made as to what event to use to turn off the NFET and turn on the PFET and give the normal control loop an opportunity to resume control. Example implementations include using the rising edge of a buck switching clock or using a constant NFET on time value. Both of these methods exhibit problems when the output voltage is low or in a ground fault condition since there is often not enough negative differential across the inductor when the NFET is on to discharge the all the inductor energy that was added when the PFET was on. If such a condition exists, multiple consecutive cycles of a net increase in the inductor current will result in a condition called current limit runaway.

Practical limitations on the current limit detection speed require the PFET to be on for a minimum amount of time in order to declare a valid over-current condition. This results in finite overshoot of the desired current limit threshold. At low output voltages, the overshoot magnitude is largest. Overshoot results in more energy added while the PFET is on, and faults to ground keep the energy from being fully dissipated while the NFET is on, resulting in a worst case situation for runaway concerns. Current limit runaway can be a serious problem for reliability of the power FETs and the inductor. It can also lead to undesirable inrush currents that can overtax battery powered applications.

Exemplary embodiments, as described herein, are directed to devices and methods related to over-current protection for a voltage regulator. According to one exemplary embodiment, a device may include an inductor selectively coupled to an output and a power supply. The device may further include a controller configured to detect an over-current event if an amount of current flowing from the power supply to the inductor is equal to or greater than a current threshold. The controller may also be configured to detect a low-voltage event if a voltage at the output is less than or equal to a reference voltage. Moreover, in response to the over-current event and the low-voltage event, the controller may be configured to prevent current from flowing from the power supply to the inductor until substantially all energy stored by the inductor has been dissipated.

According to another exemplary embodiment, the present invention includes methods for protecting a voltage regulator from current runaway. Various embodiments of such a method may include comparing an output voltage of a voltage regulator to a reference voltage and comparing a current through an inductor of the regulator to a threshold current. Further, the method may include dissipating all energy stored by the inductor if the current through the inductor is greater than or equal to the threshold current and the output voltage is less than or equal to the reference voltage.

Other aspects, as well as features and advantages of various aspects, of the present invention will become apparent to those of skill in the art through consideration of the ensuing description, the accompanying drawings and the appended claims.

Figure 2:
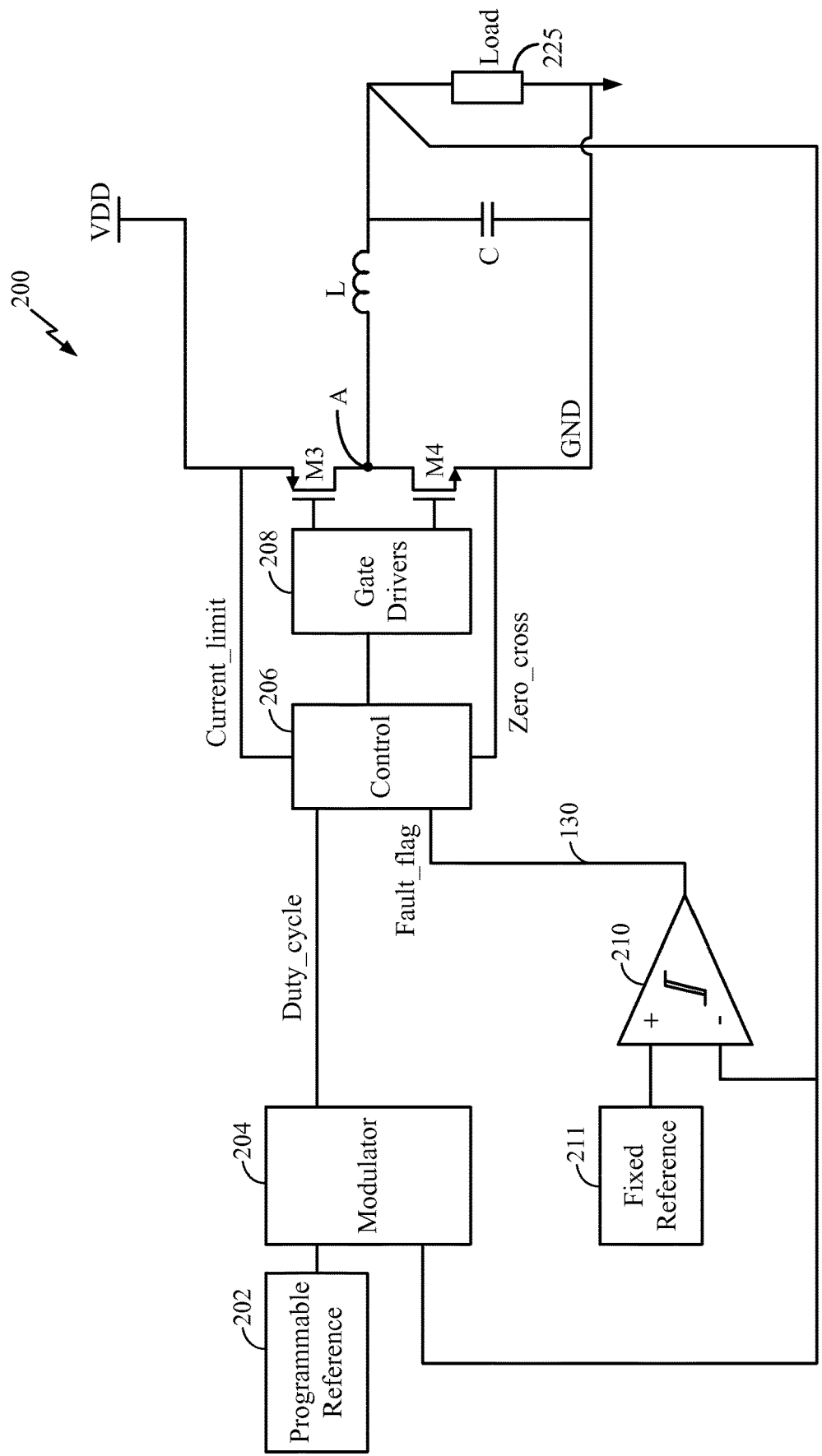
FIG. 2 illustrates a device including a regulator, according to an exemplary embodiment of the present invention.

FIG. 2 illustrates a device 200, in accordance with an exemplary embodiment of the present invention. By way of example, device 200 may comprise a buck regulator. Device 200 includes a programmable reference unit 202, a modulator 204, a controller 206, and gate drivers 208. An output of programmable reference unit 202 is coupled to one input of modulator 204, and an output of modulator 204 is coupled to one input of controller 206. Moreover, an output of controller 206 is coupled to an input of gate drivers 208.

Device 200 further includes transistors M3 and M3 coupled between a supply voltage VDD and a ground voltage GND. More specifically, a source of transistor M3 is coupled to supply voltage VDD and a source of transistor M4 is coupled to ground voltage GND. Further, a drain of transistor M3 is coupled to a drain of transistor M4 at a node A, which may also be referred to as a "switching node." In addition, a gate of each of transistor M3 and transistor M4 is coupled to and configured to receive a signal from gate drivers 208. Transistors M3, which may comprise a PFET, may also be referred to herein as a "high side FET." Further, Transistors M4, which may comprise an NFET, may also be referred to herein as a "low side FET." Device 200 further includes an inductor L having one end coupled to node A and another end coupled to an output Vout. In addition, device 200 includes a capacitor C coupled between output Vout and ground voltage GND, and a load 225, also coupled between output Vout and ground voltage GND.

As will be understood by a person having ordinary skill in the art, programmable reference unit 202 and modulator 204 provide a signal having a desired duty cycle to controller 206. Based on the duty cycle, controller 206 and gate drivers 208 may be configured to turn transistor M3 "on" and "off" to store energy provided by supply voltage VDD in inductor L. Controller 206 and gate drivers 208 may be further configured to turn transistor M4 "on" and "off," based on the duty cycle, to discharge energy stored by inductor L through the load 225. This discharged energy is provided at a desired output voltage that is typically designed to be less than supply voltage VDD. Device 200 provides an output across capacitor C and power provided by device 200 at this output is consumed by load 225.

Device 200 may also include one or more current sensors (not shown in FIG. 2; see FIG. 3) for sensing a current through transistor M3 and inductor L while transistor M3 is operating in a conductive state, sensing a current through transistor M4 and inductor L while transistor M4 is operating in a conductive state, or both. As described more fully below, in the event the current through transistor M3 and inductor L is greater than a threshold current, controller 206 may be configured to turn "off" transistor M3 (i.e., cause transistor M3 to operate in a non-conductive state) and turn "on" transistor M4 (i.e., cause transistor M4 to operate in a conductive state).

Additionally, device 200 includes a comparator 210 having one input configured to receive a fixed reference voltage Vref from a reference generator 211 and another input coupled to output voltage Vout. By way of example only, reference voltage Vref may comprise a voltage of substantially 0.25 volts. An output of comparator 210 is coupled to an input of controller 206. Comparator 210 is configured to compare reference voltage Vref and output voltage Vout, and, in response to the comparison, convey a signal to controller 206. If output voltage Vout is greater than reference voltage Vref, comparator 210 may convey a signal indicative thereof to controller 206. Similarly, if output voltage Vout is less than or equal to reference voltage Vref, comparator 210 may convey a signal indicative thereof to controller 206. Stated another way, comparator 210 is configured to detect when the regulator output voltage Vout has dropped below a comparator threshold voltage (i.e., reference voltage Vref) and convey a signal indicating that a runaway condition could occur if the current through inductor L were to cross a current limit threshold value. According to at least one embodiment, comparator 210 may be configured to provide a hysteresis to establish a controlled response if the output voltage Vout of device 200 is hovering near threshold voltage Vth.

A contemplated operation of device 200 will now be described. During operation, controller 206, via gate drivers 208, may vary the duty cycles at which transistors M3 and M4 are turned on to alternately connect and disconnect inductor L to and from supply voltage VDD. As inductor L stores energy and discharges the energy, it produces output voltage Vout, which may be somewhat smaller than supply voltage VDD. Further, device 200 may monitor a current through the high-side FET M3 relative to a threshold current. In addition, device 200 may monitor output voltage Vout and compare output voltage Vout to reference voltage Vref. If at any time the sensed current rises above a threshold current and output voltage is greater than reference voltage, controller 206 may turn the high-side FET M3 "off" and turn the low-side FET "on" for a fixed amount of time. In contrast, if the sensed current rises above a threshold current and output voltage is less than or equal to reference voltage Vref, controller 206 may turn the high-side FET M3 "off" and turn the low-side FET "on" until the current flowing through inductor L is substantially equal to zero.

Another, more specific, contemplated operation of device will now be described. During operation, device 200 may monitor a current through the high-side FET M1 relative to a threshold current. Further, device 200 may monitor output voltage Vout relative to reference voltage Vref. In response to receipt of a signal from comparator 210 indicative of output voltage falling to a value equal to a less than reference voltage Vref, controller 206 may be configured to enable a current limit "foldback mode." If, during the "foldback mode," the current through inductor L ("inductor current") exceeds a current limit threshold (i.e., a reference current), controller 206 may cause the inductor current to ramp down to substantially zero before the inductor current L is allowed to ramp up again. It is noted that the inductor current may be forced to discharge to substantially zero, regardless of the values of supply voltage VDD or output voltage Vout, thereby ensuring that the inductor current cannot runaway. As described with reference to FIG. 3 below, an inductor current upward ramp may be monitored by a comparator (i.e., comparator 282) while transistor M3 is on (i.e., conducting) and an inductor current downward ramp may be monitored by a zero crossing comparator (i.e., comparator 284) while transistor M4 is on (i.e., conducting).

The foldback mode may use two current limit levels (i.e., the current limit threshold and a zero current) to regulate an average inductor current. The average current delivered to the output of regulator 200 while operating in the foldback mode is half of the current limit value, hence the "foldback" terminology. Since the current limit threshold is usually set near a rated current of a regulator (e.g., device 200) delivering half of the current limit value in foldback mode means that the rated load may not be supported in this mode. This is generally not a system limitation for normal operation if the fault comparator reference voltage Vref is set at a low enough threshold where load 225 is not expected to be able to draw the full rated current.

Figure 3:
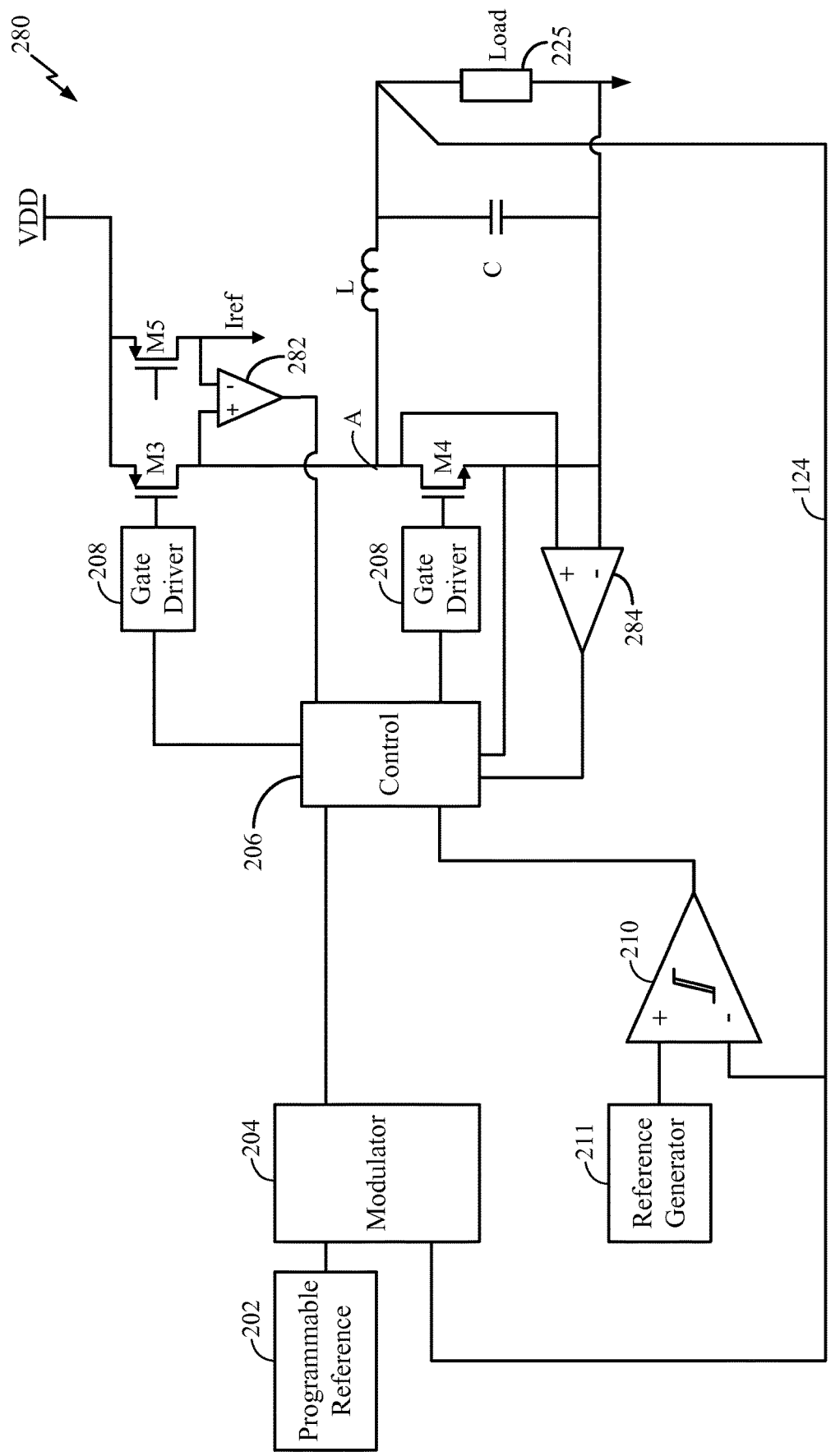
FIG. 3 depicts another device including a regulator, in accordance with an exemplary embodiment of the present invention.

FIG. 3 illustrates a device 280, in accordance with an exemplary embodiment of the present invention. Similar to device 200, device 280 includes programmable reference 202, modulator 204, controller 206, and gate drivers 208. Device 280 further includes transistors M3 and M4, inductor L, capacitor C and load 225. Additionally, device 280 includes comparator 210 having one input configured to receive a fixed reference voltage Vref and another input coupled to output voltage Vout 124. Further, device 280 includes another comparator 282 including one input coupled to a drain of transistor M3 and another input coupled to a drain of a reference transistor M5. Comparator 282 may be used to monitor a reference current Iref (i.e., a current flowing through transistor M5) relative to a current flowing through transistor M3 and, in response to thereto, convey a signal to controller 206. As noted above, if the current flowing through transistor M3 rises to a value equal to or greater than a threshold current (i.e., reference current), and output voltage Vout 124 is greater than reference voltage Vref, controller 206 may cause the current to be re-circulated (i.e., via turning off transistor M3 and turning on transistor M4) for a fixed amount of time.

Moreover, as noted above, if the current through transistor M3 rises to a value equal to or greater than a threshold current, and output voltage Vout 124 is less than or equal to reference voltage Vref, controller 206 may turn high-side FET M3 "off" and turn low-side FET M4 "on" until the current flowing through inductor L is substantially equal to zero. According to one exemplary embodiment, device 280 further includes a comparator 284 including one input coupled to a ground voltage and another input coupled to node A. Comparator 284 may be configured to compare the voltage at node A to the ground voltage and, in response to the comparison, convey a signal to controller 206 indicative of whether a current through inductor L has fallen to substantially zero.

Figure 4:
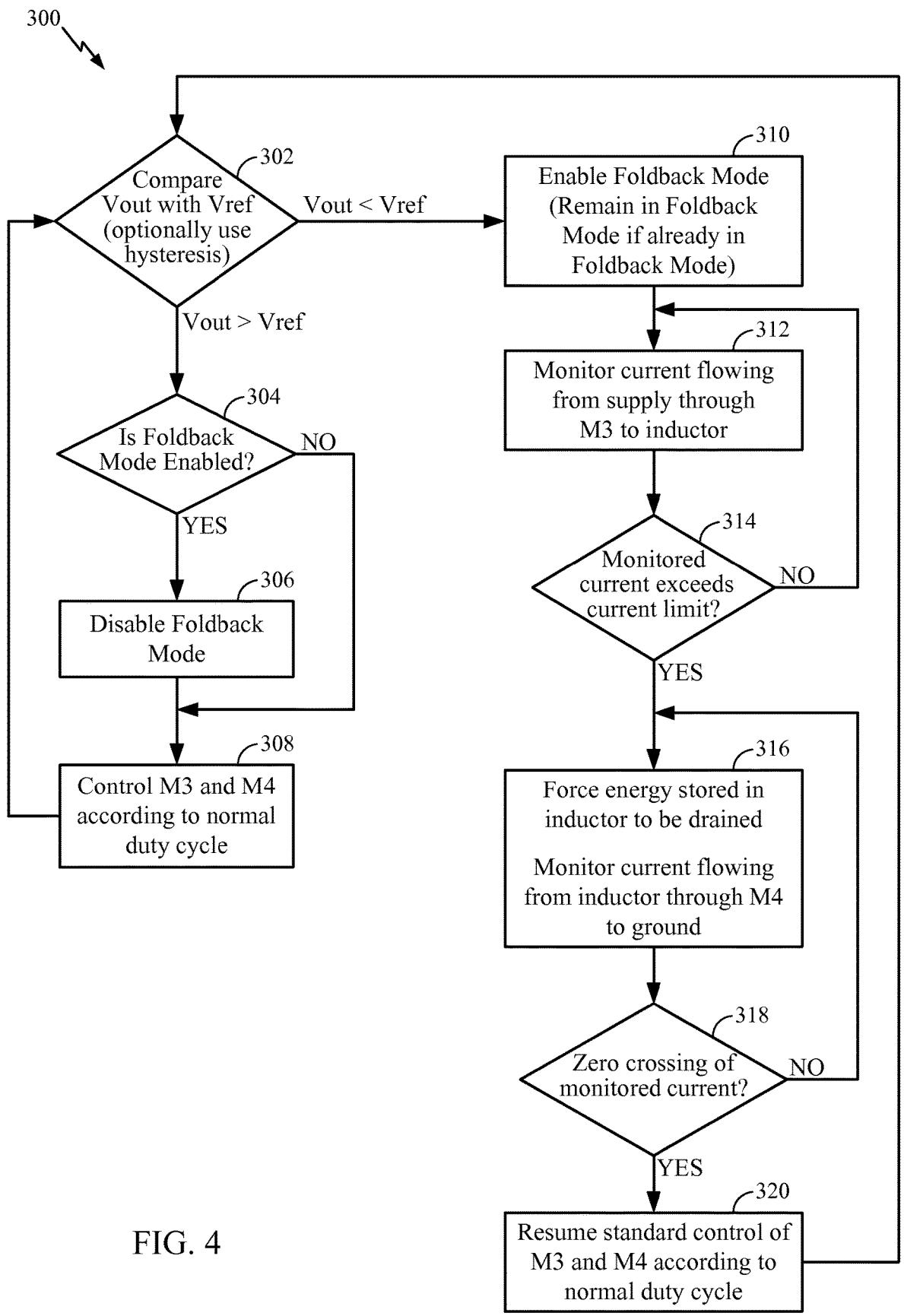
FIG. 4 is a flowchart depicting a method, according to an exemplary embodiment of the present invention.

FIG. 4 is a flowchart illustrating a method 300, in accordance with an exemplary embodiment of the present invention. Method 300 will now be described with reference to FIGS. 2-4. At step 302 of method 300, comparator 210 may compare output voltage Vout to a reference voltage Vref. If output voltage Vout is less than reference voltage Vref, comparator 210 may assert a fault flag 130. As noted above, comparator 210 may be configured to use time or voltage hysteresis when comparing reference voltage Vref to output voltage Vout. For example, comparator 210 may output a fault flag 130 when output voltage Vout has been less than or equal to reference voltage Vref for a predetermined amount of time, rather than immediately asserting fault flag 130 as soon as output voltage Vout is less than or equal to reference voltage Vref.

In the event comparator 210 asserts fault flag 130, controller 206 may enable a foldback mode of device 200 (depicted in step 310). If device 200 is already in operating in the foldback mode, device 200 may remain in foldback mode. While in foldback mode, controller 206 may be configured to monitor an amount of current flowing from voltage supply VDD through transistor M3 to inductor L via a current flowing through node A (depicted by reference numeral 312). At step 314, controller 206 may determine, via the current flowing through node A, whether the amount of current flowing through transistor M3 exceeds a current limit. Typically, the current limit for device 200 may be set at a level higher than the amount of current that device 200 is normally expected to deliver to the load.

If controller 206 determines that the monitored current flowing through transistor M3 exceeds the current limit, controller 206, at step 316, may cause the energy stored in inductor L to drain. According to one exemplary embodiment, controller 206 may cause transistor M3 to be turned off and transistor M4 to be turned on (e.g., using gate drivers 208) to drain the energy from inductor L. Transistor M3 may remain off and transistor M4 may remain on until substantially all of the energy stored by inductor L is drained. It is noted that controller 206 may determine when all of the energy has drain from inductor L by monitoring the current flowing through transistor M4. Controller 206 may monitor the current flowing through transistor M4 by monitoring, via comparator 284, a current flowing through transistor M4.

At step 318, controller 206 may determine whether the monitored current flowing through transistor M4 has crossed zero. If so, inductor L has drained substantially all of its energy and, at step 320, controller 206 may resume standard control of transistors M3 and M4, alternately switching transistors M3 and M4 according to a normal duty cycle configured to provide a designed output voltage to the load 122. Operation continues at step 302, where comparator 210 again compares output voltage Vout to reference voltage Vref.

In the event controller 206 determines that the monitored current flowing through transistor M4 has not yet crossed zero, at step 316, transistor M3 may remain off and transistor M4 may remain on so that the energy stored by inductor L continues to drain out of inductor L to ground via transistor M4 and the load. Ensuring that the energy stored by inductor L is drained before transistor M3 is allowed to turn on again may prevent device 200 from experiencing current limit runaway. Note that one result of the combination of steps 316, 318, and 320, is that controller 206 may wait to resume standard control of transistors M3 and M4 until the zero crossing of the monitored current. Thus, controller 206 may wait to resume standard control until all or substantially all of the energy stored by inductor L has been drained no matter how long draining the energy may take. Stated another way, controller 206 may allow inductor L to drain its energy independent of any duty cycle or frequency provided by programmable reference 202 or modulator 204. This may prevent the conditions described earlier that lead to current limit runaway.

Although method 300 is illustrated as a series of sequential steps, it should be appreciated that comparator 210, at step 302, may continuously compare output voltage Vout to reference Vref so that operation of device 200 can change as soon as the relationship between output voltage Vout and reference voltage Vref changes. For example, shortly or immediately after output voltage Vout is less than reference voltage Vref (i.e., taking into account any hysteresis settings as described above), controller 206 may enable foldback mode. Similarly, shortly or immediately after output voltage Vout is greater than reference voltage Vref (i.e., again taking into account any hysteresis setting), controller 206 may disable foldback mode.

Returning now to step 302, if comparator 210 determines that output voltage Vout is greater than reference voltage Vref, comparator 210 may de-assert fault flag 130. At step 304, controller 206 may determine whether device 200 is already in foldback mode. If so, at step 306 controller 206 may disable foldback mode. If device 200 is not operating in foldback mode, operation may continue at step 308. At step 308, controller 206 may continue standard control of transistor M3 and transistor M4, alternately switching transistors M3 and M3 according to a normal duty cycle configured to provide a designed output voltage to the load.

Figure 5:
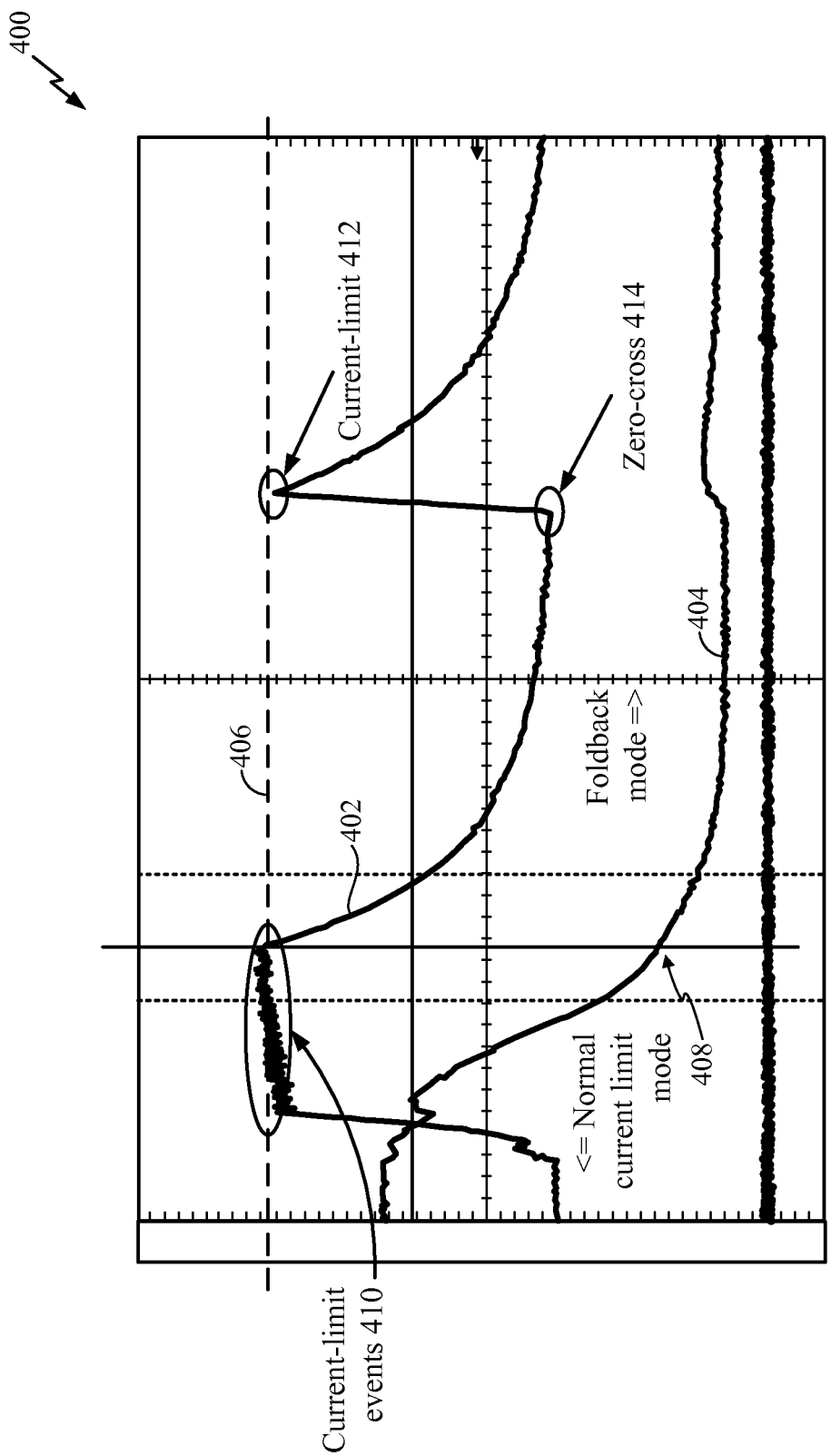
FIG. 5 is a plot depicting various signals of a regulator.

FIG. 5 is a plot 400 depicting various signals of a regulator, such as device 200 illustrated in FIG. 2 or device 280 illustrated in FIG. 3. Signal 402 represents a current flowing through inductor L of the regulator and signal 404 represents output voltage Vout of the regulator. Plot 400 further depicts a current limit value 406. As depicted by reference numeral 410, the current represented by signal 402 approaches the current limit value 406 (e.g., signal 402 is being limited to current limit value 406 using a constant off time). As depicted, the voltage represented by signal 404 begins to drop (e.g., because of a load fault or load short at an output) and when signal 404 crosses the reference voltage Vref at 408, controller 206 (see FIG. 2 or FIG. 3) may cause the regulator to enter foldback mode in which transistor M3 is turned off and transistor M4 is turned on. Consequently, signal 402 representing the current through inductor L begins to decrease as the energy stored by inductor L drains. Eventually, signal 402 crosses zero at 414. At this point, controller 206 may resume standard control of transistors M3 and M4 as indicated by step 302 of method 300. Consequently, signal 402 (i.e., the current through inductor L) increases sharply until it hits the current limit 406 at 412. Note that since signal 404, which represents output voltage Vout, is still below Vref, the buck regulator remains in foldback mode. After reaching the current limit 406 at 412, in accordance with steps 314 and 316 of method 300, signal 402 begins to fall again.

Figure 6:
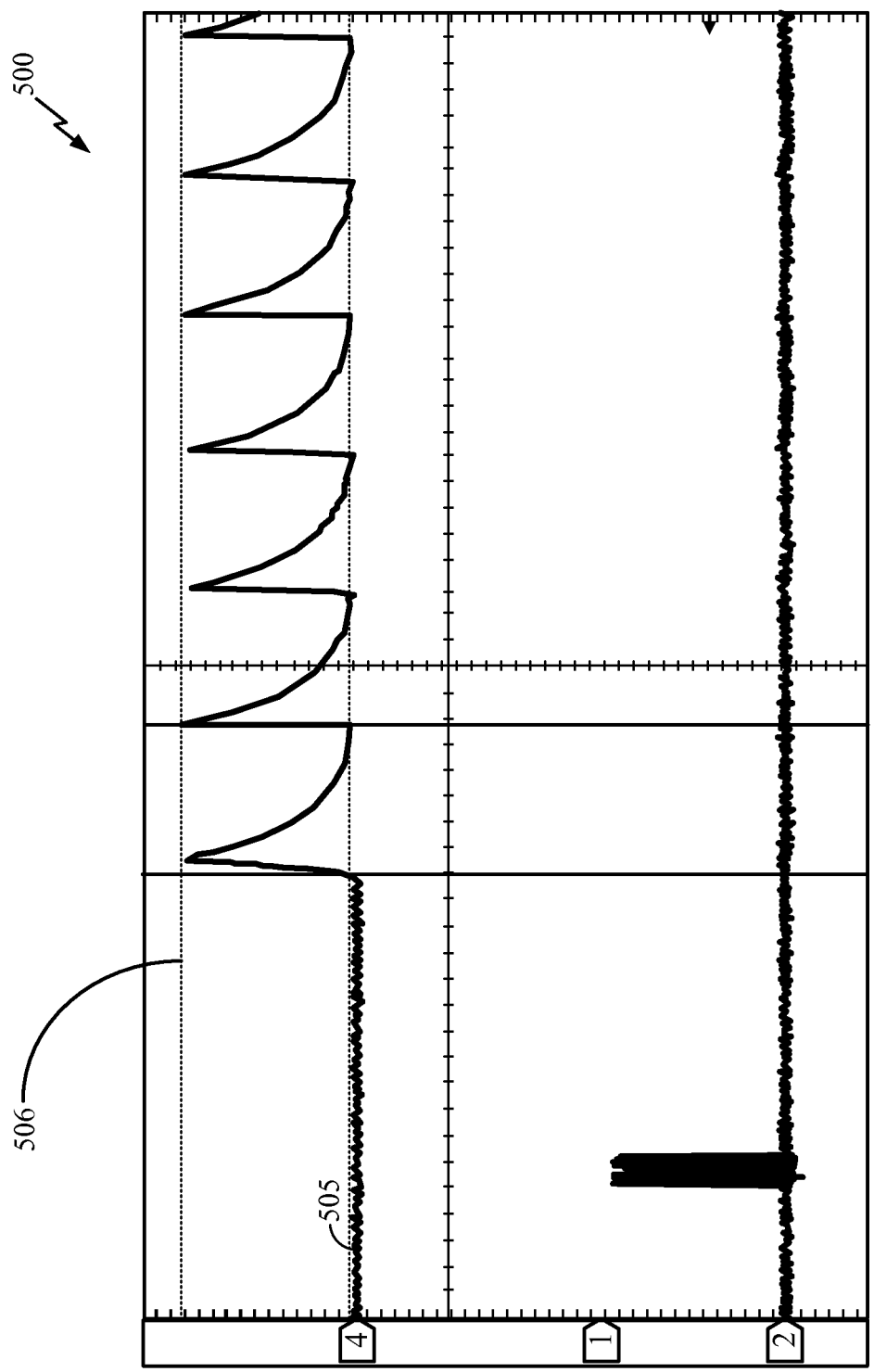
FIG. 6 is another plot depicting a signal that represents a current through inductor of a regulator.

FIG. 6 is another plot 500 depicting a signal 505, which represents a current through inductor L. As illustrated, signal 505 rapidly rises until it hits current limit 506, and then falls until it crosses zero, at which point it rapidly rises again until it hits current limit 506. These cycles illustrate foldback mode in which the average current delivered by the regulator "folds back" to a value of about one half of the current limit.

Figure 7:
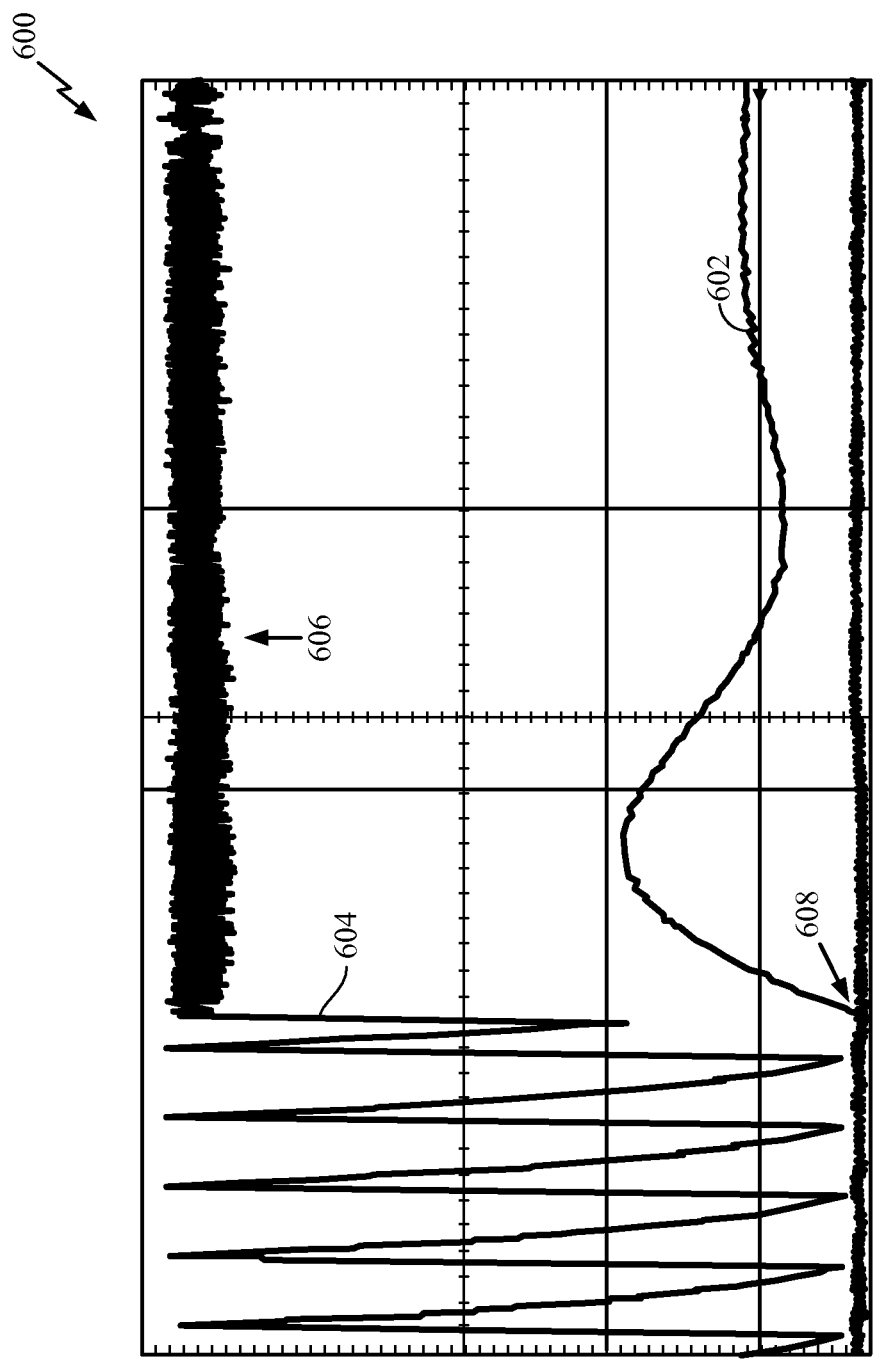
FIG. 7 is yet another plot depicting signal indicative of a regulator exiting a foldback mode and resuming normal duty cycle operation.

FIG. 7 is yet another plot 600 depicting a regulator (e.g., device 200) exiting foldback mode and resuming normal duty cycle operation (i.e., non foldback current limit operation). Output voltage Vout is illustrated as signal 602, current through inductor L is illustrated as plots 604 and 606. Prior to a point depicted by reference numeral 608, signal 602 (i.e., output voltage Vout) is below reference voltage Vref and the regulator is in foldback mode. Due to a short or fault associated with load 225, current 604 oscillates between the current limit and zero in foldback mode. When output voltage 602 rises above Vref at point 608, the regulator exits foldback mode. However, the short or fault associated with load 225 is still present to at least some degree. Consequently, current 606 hovers near the current limit.

Figure 8:
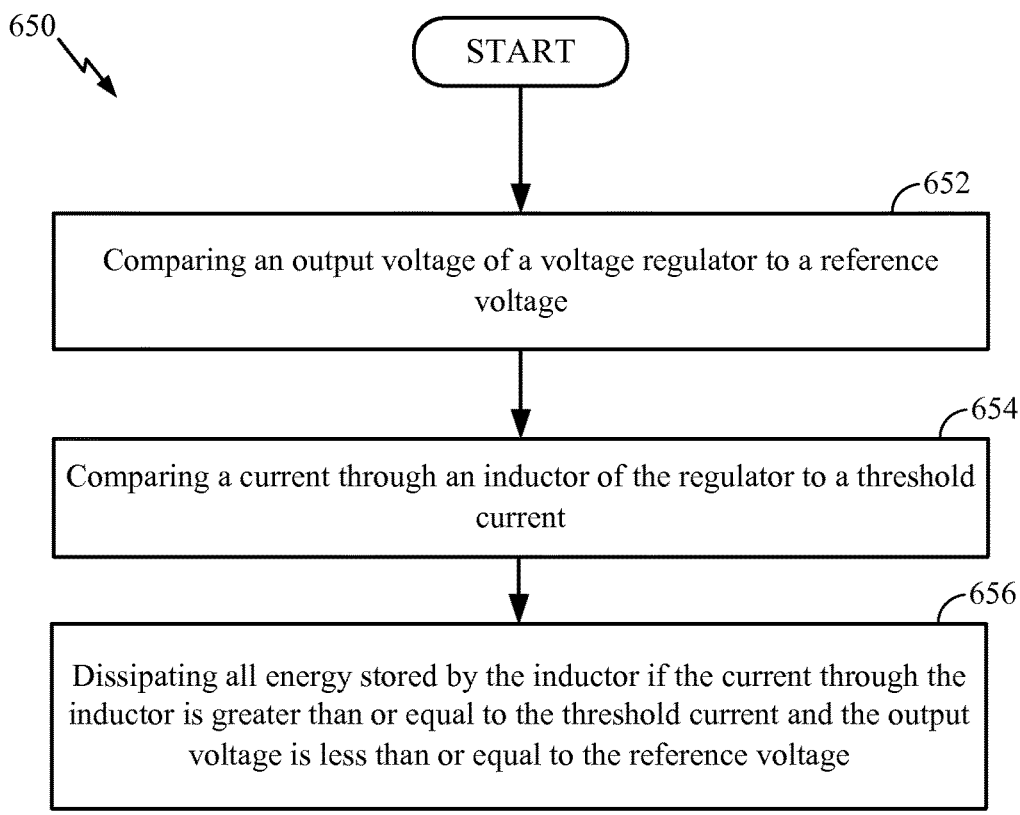
FIG. 8 is a flowchart depicting a method, in accordance with an exemplary embodiment of the present invention.

FIG. 8 is a flowchart illustrating a method 650, in accordance with one or more exemplary embodiments. Method 650 may include comparing an output voltage of a voltage regulator to a reference voltage (depicted by numeral 652). Method 650 may also include comparing a current through an inductor of the regulator to a threshold current (depicted by numeral 654). In addition, method 650 may include dissipating all energy stored by the inductor if the current through the inductor is greater than or equal to the threshold current and the output voltage is less than or equal to the reference voltage (depicted by numeral 656).

Figure 9:
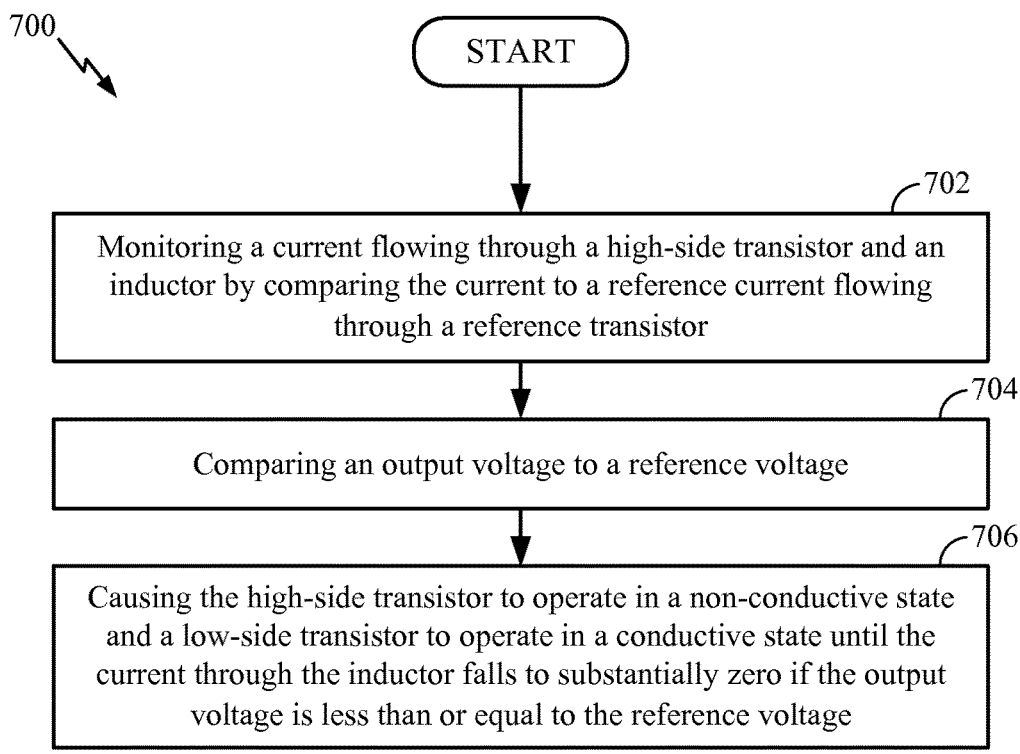
FIG. 9 is a flowchart depicting another method, in accordance with an exemplary embodiment of the present invention.

FIG. 9 is a flowchart illustrating another method 700, in accordance with one or more exemplary embodiments. Method 700 may include monitoring a current flowing through a high-side transistor and an inductor by comparing the current to a reference current flowing through a reference transistor (depicted by numeral 702). In addition, method 700 may also include comparing an output voltage to a reference voltage (depicted by numeral 704). Method 700 may also include causing the high-side transistor to operate in a non-conductive state and a low-side transistor to operate in a conductive state until the current through the inductor falls to substantially zero if the output voltage is less than or equal to the reference voltage (depicted by numeral 706).

In comparison to conventional systems where a current limit runaway may occur when a current limit algorithm does not allow for sufficient time to dissipate more inductor energy during a high-side FET off time than the inductor energy that is put in during a high-side FET on time, the present invention forces the energy stored in an inductor of a buck regulator to dissipate completely or substantially completely when the output voltage of the buck regulator falls below a threshold voltage.

Figure 10:
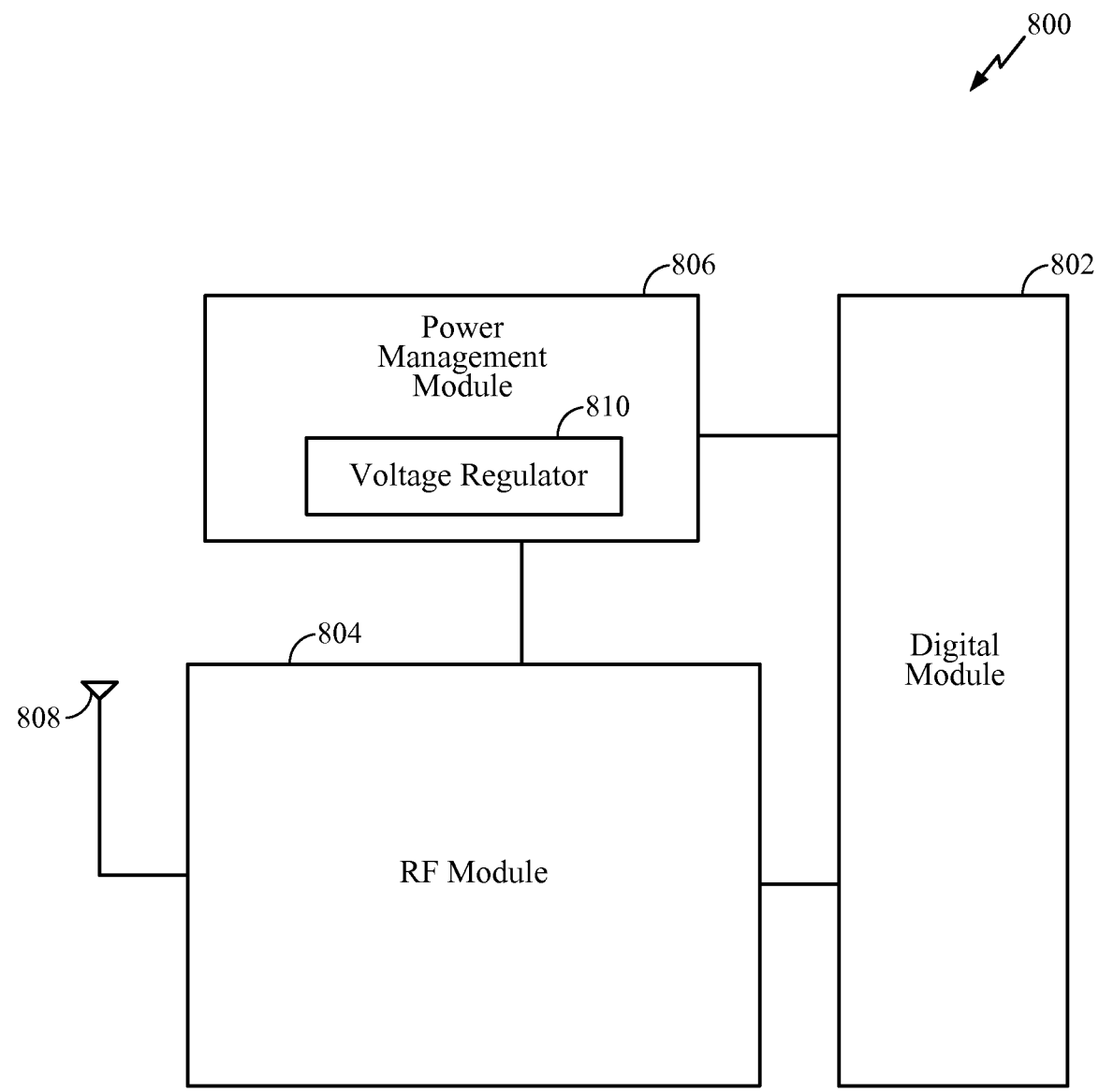
FIG. 10 illustrates a device including a regulator, in accordance with an exemplary embodiment of the present invention.

FIG. 10 is a block diagram of an electronic device 800, according to an exemplary embodiment of the present invention. According to one example, device 800 may comprise a portable electronic device, such as a mobile telephone. Device 800 may include various modules, such as a digital module 802, an RF module 804, and power management module 806. Digital module 802 may comprise memory and one or more processors. RF module 804, which may comprise RF circuitry, may include a transceiver including a transmitter and a receiver and may be configured for bi-directional wireless communication via an antenna 808. In general, wireless communication device 800 may include any number of transmitters and any number of receivers for any number of communication systems, any number of frequency bands, and any number of antennas.

According to an exemplary embodiment of the present invention, power management module 906 may include one or more of voltage regulators 810, which may comprise one or more of device 200 (see FIG. 2), one or more of device 280 (see FIG. 3), or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
an inductor selectively coupled to an output and a power supply;
a p-type field effect transistor (PFET) coupled between the power supply and the inductor;
a n-type field effect transistor (NFET) coupled to the PFET and between the inductor and a ground voltage;
a first comparator configured to compare the voltage at the output and a reference voltage and convey a signal indicative of the comparison;
a second comparator having a first input coupled to a drain of the NFET, a second input coupled to a source of the NFET and the ground voltage, and an output coupled to a controller, the second comparator configured to detect an amount of current flowing through the NFET;
a third comparator configured to compare a current through the PFET and a reference current through a third transistor coupled to the PFET; and
the controller configured to:
detect an amount of current flowing from the power supply to the inductor is equal to or greater than a current threshold,
detect a voltage at the output is less than or equal to the reference voltage,
in response to detecting the voltage at the output is less than or equal to the reference voltage, cause the device to enter into a foldback mode, and
in response to detecting the amount of current flowing from the power supply to the inductor is equal to or greater than the current threshold during the foldback mode, switch off the PFET and switch on the NFET to prevent current from flowing from the power supply to the inductor until the amount of current flowing through the NFET crosses zero.

2. The device of claim 1, the controller further configured to receive an output of the second comparator to detect if the amount of current from the power supply to the inductor is equal to or greater than the current threshold.

3. The device of claim 1, wherein the reference voltage is fixed.

4. The device of claim 1, wherein the controller is further configured to switch off the PFET and switch on the NFET to prevent current from flowing from the power supply to the inductor until substantially all energy stored in the inductor has dissipated.

5. The device of claim 1, further comprising:
a programmable reference; and
a modulator having a first input, a second input, and an output, the first input coupled to the programmable reference, the second input coupled to the output, and the output coupled to the controller to provide an input signal to the controller.

6. An electronic device, comprising:
a radio frequency (RF) module; and
a power management module coupled to the RF module, the power management module having a voltage regulator, the voltage regulator including the device of claim 1.

7. A voltage regulator, comprising:
an inductor having a first end coupled to an output and a second end selectively coupled to at least one of a supply voltage and a ground voltage;
a p-type field effect transistor (PFET) coupled between the supply voltage and the inductor;
a n-type field effect transistor (NFET) coupled to the PFET and between the inductor and the ground voltage;
a current sensor coupled across the NFET, the current sensor comprising a comparator having a first input coupled to a drain of the NFET, a second input coupled to a source of the NFET, and an output coupled to a controller; and
the controller configured to:
  detect if a voltage at the output is less than a threshold voltage,
  cause the voltage regulator to enter into a foldback mode if the voltage at the output is less than the threshold voltage,
  monitor a current flowing from the supply voltage to the inductor to detect if the current is greater than a threshold current,
  in response to the current being greater than the threshold current during the foldback mode, switch off the PFET and switch on the NFET to electrically isolate the inductor from the supply voltage for an amount of time,
  monitor a second current flowing through the NFET, and
  in response to the second current crosses zero, alternately switch the PFET and the NFET to resume normal duty cycle operation.

8. The voltage regulator of claim 7, further comprising:
a voltage comparator coupled to the output and the controller and configured to:
  compare the voltage at the output to the threshold voltage; and
  convey a signal to the controller indicative of the comparison of the voltage at the output to the threshold voltage.

9. The voltage regulator of claim 7, wherein the threshold voltage comprises a voltage of substantially 0.25 volts.

10. The voltage regulator of claim 7, the controller further configured to, in response to the voltage being greater than the threshold voltage and the current being greater than the threshold current, electrically isolate the inductor from the supply voltage for a fixed duration.

11. The voltage regulator of claim 7, the controller further configured to electrically isolate the inductor from the supply voltage until substantially all energy stored in the inductor has been dissipated if the current flowing from the supply voltage to the inductor is greater than the threshold current during the foldback mode.

* * * * *